Feb. 8, 1938.  T. I. POTTER  2,107,763
REFRIGERATOR
Original Filed March 7, 1933
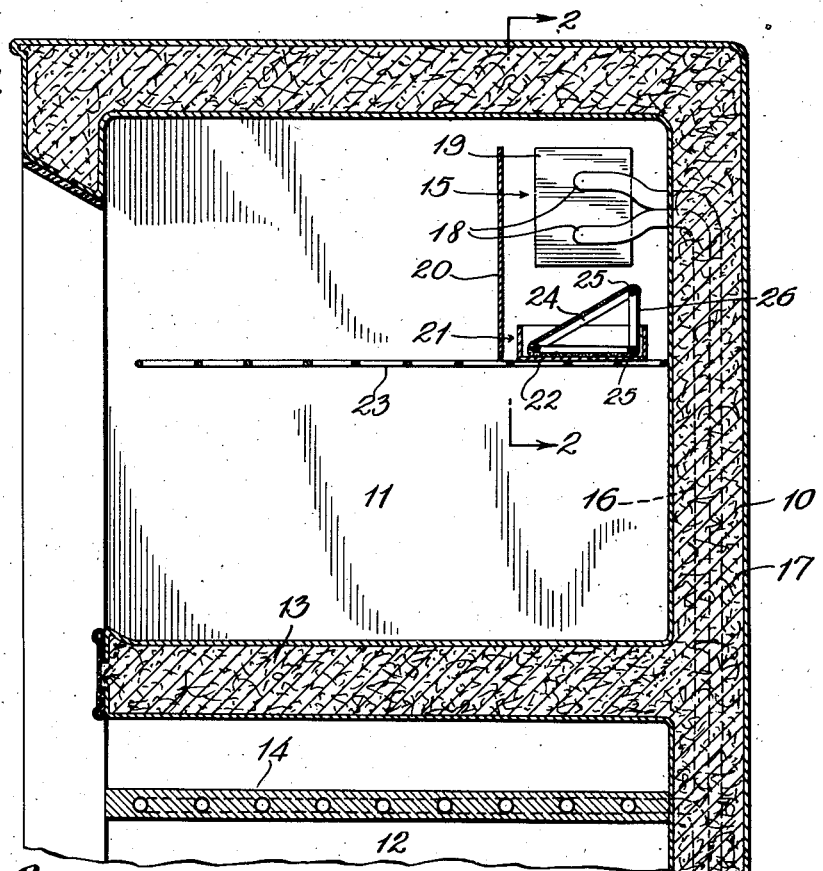
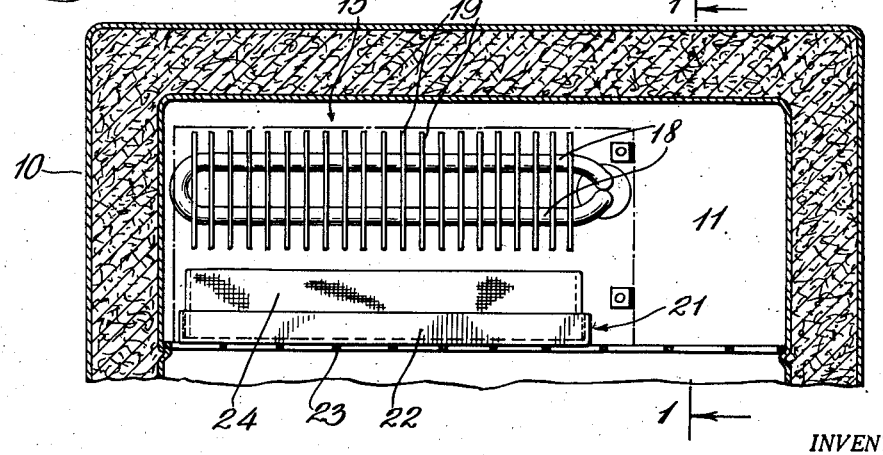
INVENTOR.
THOMAS I. POTTER
BY
ATTORNEY Patented Feb. 8, 1938

2,107,763

UNITED STATES PATENT OFFICE 2,107,763

REFRIGERATOR

Thomas I. Potter, Buffalo, N. Y.

Application March 7, 1933, Serial No. 659,917
Renewed June 16, 1937

5 Claims. (Cl. 62—116)

The present invention relates to mechanical refrigerators and has for an object to provide a refrigerator having means for conditioning the atmosphere therein.

My invention is adapted more particularly, but not exclusively, to household refrigerators. Heretofore, little attention has been paid to atmospheric conditioning of food storage compartments. In the ordinary household refrigerator a freezing unit is located in the food storage chamber. This unit consists of an expansion tank or a coil for refrigerant in the form of a hollow chamber adapted to receive trays for freezing ice cubes and various forms of desserts. The freezing unit must be maintained at a temperature far below the freezing point in order to effect rapid freezing of the water or desserts placed therein. As a result of this arrangement, the air in the food chamber deposits its moisture by condensation on the walls of the freezing unit, and this moisture is immediately turned into ice. The freezing unit thus rapidly dries out the air. Because of the dryness of the atmosphere many foods are wilted, shriveled, or otherwise damaged. To overcome this difficulty, it is commonly recommended that the foods be placed in closed containers, but aside from the bother of covering all foods and of finding room for all the closed containers, there is another serious drawback, namely, that moist food kept in the stagnant air within the container is apt to become moldy, even at temperatures close to the freezing point.

In a copending application Serial No. 516,032, filed February 16, 1931, a refrigerator is described in which the food cooling chamber is kept at a low temperature, say 40 degrees F., by an expansion coil of the non-frosting type, while the freezing unit of the refrigerator is placed in a separate chamber where a temperature far below freezing is maintained. This arrangement provides a chamber in which the atmosphere is very dry and cold and another chamber in which the atmosphere is cool enough to preserve food but in which a considerable content of moisture may be maintained.

It is well-known that the amount of water vapor that the air will hold depends upon its temperture and 100 per cent. humidity at one temperature is very different from 100 per cent. humidity at another. Air with a certain vapor content will deposit its moisture in the form of dew or frost when it is chilled below the temperature at which such vapor content can be supported. At 40 degrees F. air will be at the saturation point when it contains 36.4 grains of vapor per pound of dry air. At 12 degrees F. it cannot hold more than 10.13 grains of vapor and at 0 degrees F. not more than 5.47 grains. Hence the greater the difference in temperature between the freezing unit and the average air temperature in the food chamber, the more actively will said unit pump moisture out of the air and if such moisture is immediately frozen there will be no way for the air to pick it up again. By using a non-frosting unit instead of the customary low freezing unit, there is but a slight drop in temperature of the air that contacts with said non-frosting unit and abstration of moisture from the air will proceed very slowly, stopping when the average moisture in the air is slightly reduced. If, for instance, the average temperature in the chamber is 40 degrees F. and the air is at its saturation point, that is 100 per cent. humidity, and if the air contacting with the coil is chilled to say 38 degrees F., there will be a deposit of moisture on the coil, which, however, will stop when the vapor content is reduced to 33.66 grains per pound, or, in other words, when the humidity has been reduced to 92 per cent. Theoretically this slight dryness of the atmosphere will cause a certain amount of vapor absorption from moist foods, but the extent of such absorption will be almost negligible and certainly in no sense comparable to that prevailing in the ordinary refrigerator.

An object of the present invention is to supply moisture to the cooling chamber of a refrigerator so as to maintain a high percentage of humidity.

Another object is to provide means for restoring to the air in the chamber the moisture abstracted therefrom by the cooling unit, so that the vapor in the air will be maintained close to its saturation point.

Where a freezing unit is used this cannot be done because the vapor deposited thereon is solidified and hence substantially eliminated from re-entry into the air. However, with a non-frosting unit the vapor is deposited as dew and my invention contemplates trapping this dew in a humidifier from which the vapor may be picked up again by the surrounding air.

Other objects and advantages of my invention will appear in the following description of a preferred embodiment, and thereafter the novelty and scope of the invention will be pointed out in the claims.

In the accompanying drawing;

Figure 1 is a fragmental view in vertical section of a refrigerator embodying my invention, said section being taken substantially on the line 1—1 of Fig. 2; and Fig. 2 is a fragmental view in vertical section taken substantially on the line 2—2 of Fig. 1.

In the drawing, I have used the reference numeral 10 to indicate a refrigerator cabinet. This cabinet has an upper food storage chamber 11 and a lower food storage chamber 12 with a wall 13 therebetween which thermally insulates one chamber from the other. In the lower chamber 12 is placed a freezing unit 14 formed of a plate or shelf on which trays may be placed for forming ice cubes or for freezing desserts. It is intended that this freezing unit be maintained at a very low temperature, so as to effect rapid freezing of the foods placed thereon or in the space below the shelf. I have found that if the freezing unit be maintained at a temperature close to or below zero Fahrenheit any moisture that is abstracted from the surrounding atmosphere will collect thereon as a snow-like frost which may be readily brushed or scraped off, while if the temperature of the freezing unit is higher the moisture will collect as ice and will gradually build insulation around the freezing unit. Thus, by maintaining a low temperature in the freezing unit 14, it will not be necessary to de-frost this unit as is commonly required in ordinary practice.

In the upper chamber 11, I provide a non-frosting unit 15 which is connected in series with the unit 14 in a refrigerating line 16, the latter being embedded in the insulation 17 in the rear wall of the cabinet. The non-frosting unit comprises a coil 18 through which the refrigerant flows and is fitted with transverse plates or vanes 19 which are adapted to pick up the heat from the chamber 11, such heat being carried into the coil at such a rate that they are not cooled below the freezing point. In fact the average temperature of these plates is only slightly below that of the air circulating past them.

A vertical partition 20 is provided to conceal the non-frosting unit. This partition is spaced from the unit and also from the top of the chamber so that air may circulate over the partition and on being chilled by contact with the non-frosting unit will move by gravity downward into the lower part of the chamber.

Placed directly under the unit 15 is a humidifier 21. This comprises a shallow pan 22 resting on a shelf 23. Supported in and projecting downwardly from the pan are two triangular end frames 24 which are connected at their corners by three rods 25. Over these rods is stretched a sleeve 26 of fabric which serves as a wick.

In practice, the pan is partially filled with water and the water is picked up by capillary action by the wick or sleeve 26. If the vapor content of the air is below the saturation point, moisture will be picked up from the wick to satisfy the deficiency. This conditions the air initially and insures the maintenance of the air at approximately 100 per cent. humidity. Vapor condensed upon the vanes 15 will accumulate and drip upon the wick, so that at least a part of the moisture abstracted from the air by the non-frosting coil may be picked up again as the air flows over the wick. In this way, I have provided means for maintaining a balanced humidity in the upper chamber of the refrigerator, while in the lower chamber may be placed foods which will not be harmed by desiccation.

Having thus described a preferred embodiment of my invention what I claim as new and desire to secure by Letters Patent is as follows:

1. A refrigerator formed with a food chamber, a non-frosting coil therein, means for circulating a refrigerant through the coil, said coil serving to maintain the air in the chamber at a low but non-freezing temperature, a pan under the coil in position to catch any drip of moisture condensed from said air upon the coil, and a broad wick dipping into and extending outwardly from the pan to facilitate reabsorption of the moisture by the air.

2. A refrigerator formed with a food chamber, a non-frosting coil therein, means for circulating a refrigerant through the coil, a partition adapted to guide a current of air downward past the coil, a pan under the coil, a frame of triangular cross-section in the pan, and a wick in the form of a sleeve fitted over the frame with one face of the wick seated on the pan and another face projecting from the pan in a plane inclined to the direction of said current.

3. A refrigerator formed with a food chamber, a non-frosting coil therein and near the rear wall of the chamber, means for circulating a refrigerant through the coil, a partition in front of the coil and adapted to direct a current of air downward past the coil, a pan under the coil, a frame having in cross-section the form of a right-angled triangle, a wick in the form of a sleeve fitted over the frame, one face of the sleeve being seated in the pan with a second face rising vertically from the pan adjacent said rear wall and the third face thereof inclined downwardly and forwardly toward the partition.

4. A humidifier for a refrigerator comprising a pan, a wick forming an evaporating surface inclined with respect to the plane of the pan and with one edge of the wick dipping into the pan, and a frame supporting the wick.

5. A humidifier for a refrigerator comprising a pan, a frame of triangular cross-section, a wick in the form of a sleeve fitted upon the frame and adapted to rest with one face thereof in the pan and the other two faces thereof projecting outwardly from the pan.

THOMAS I. POTTER.